US012808736B2

(12) United States Patent
Kaajakari

(10) Patent No.: US 12,808,736 B2
(45) Date of Patent: Nov. 24, 2026

(54) MULTI-AXIS FORCE SENSOR

(71) Applicant: Murata Manufacturing Co., Ltd., Nagaokakyo (JP)

(72) Inventor: Ville Kaajakari, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 317 days.

(21) Appl. No.: 18/615,308

(22) Filed: Mar. 25, 2024

(65) Prior Publication Data

US 2024/0328879 A1 Oct. 3, 2024

(30) Foreign Application Priority Data

Mar. 28, 2023 (EP) .................................... 23164762

(51) Int. Cl.

*G01L 5/162* (2020.01)
*G01L 1/18* (2006.01)
*G01L 1/22* (2006.01)

(52) U.S. Cl.

CPC ................ *G01L 5/162* (2013.01); *G01L 1/18* (2013.01); *G01L 1/2206* (2013.01)

(58) Field of Classification Search

CPC .......... G01L 5/162; G01L 1/18; G01L 1/2206
See application file for complete search history.

(56) References Cited

U.S. PATENT DOCUMENTS 4,745,812 A * 5/1988 Amazeen .................. G01L 1/18 901/33
5,518,951 A * 5/1996 Paynter ................. G01L 1/2293 438/50
6,319,743 B1 * 11/2001 Marchant .............. G01L 1/2293 438/22
7,441,470 B2 * 10/2008 Morimoto ............. G01P 15/123 73/862.045
7,500,406 B2 * 3/2009 Morimoto ............. G01L 5/1627 257/419
9,034,666 B2 * 5/2015 Vaganov ............... G06F 3/0338 324/750.01
12,546,670 B1 * 2/2026 Huff ........................... G01L 1/18
2005/0151448 A1 * 7/2005 Hikida ...................... G01C 9/12 310/338

(Continued)

FOREIGN PATENT DOCUMENTS

CN 118913491 A * 11/2024 ............. G01L 19/00
EP 869366 A1 * 7/1996 ............... G01L 5/16

(Continued)

*Primary Examiner* — Jonathan M Dunlap
(74) *Attorney, Agent, or Firm* — ArentFox Schiff LLP

(57) ABSTRACT

A device is provided that includes a flexible element including a center, a top surface, a bottom surface, one or more edges, a central area surrounding the center, and a peripheral area adjacent to the one or more edges; and a mass element located on the top surface of the flexible element in the central area such that the flexible element bends in a direction when a force acts on the mass element, wherein the flexible element defines a horizontal xy-plane and a vertical z-direction which is perpendicular to the horizontal xy-plane; and wherein the flexible element has a multilayer structure comprising a dielectric layer forming the bottom surface of the flexible element and a semiconductor layer on top of the dielectric layer.

20 Claims, 12 Drawing Sheets

(56) References Cited

U.S. PATENT DOCUMENTS

| | | | | |
|---|---|---|---|---|
| 2007/0000335 | A1* | 1/2007 | Morimoto | G01L 5/1627 73/862.045 |
| 2007/0089536 | A1* | 4/2007 | Morimoto | G01L 5/162 73/862.045 |
| 2012/0194207 | A1* | 8/2012 | Vaganov | G06F 3/0338 324/750.01 |
| 2021/0172813 | A1* | 6/2021 | Tsai | G01L 1/2231 |

FOREIGN PATENT DOCUMENTS

| | | | | |
|---|---|---|---|---|
| EP | 1688725 | A1 | 8/2006 | |
| GB | 2370122 | A * | 6/2002 | G01L 1/2281 |
| WO | 2011069515 | A2 | 6/2011 | |

* cited by examiner

MULTI-AXIS FORCE SENSOR

CROSS REFERENCED TO RELATED APPLICATIONS

This application claims priority to European Patent Application No. 23164762.9, filed Mar. 28, 2023, the entire contents of which is hereby incorporated in the entirety.

TECHNICAL FIELD

This disclosure relates to electronic devices and more particularly to MEMS multi-axis force sensors. The present disclosure further concerns electrical contacting in MEMS three-axis force sensors with a plurality of piezoresistors.

BACKGROUND

A piezo-resistive force sensor is a type of sensor that converts an input mechanical force into an electrical output signal that can be measured. It comprises piezoresistors attached to an elastic diaphragm that bends with applied mechanical force. When mechanical pressure is applied to the sensor, the diaphragm flexes inducing stress in the piezoresistors. Consequently, their electrical resistance values change. Normally, any change in resistance is converted into an output voltage.

Microelectromechanical (MEMS) devices are electronic components which combine mechanical and electrical parts. They can have either simple or complex structures with various moving elements. MEMS devices include different type of sensors such as temperature sensors, pressure sensors and vibration sensors.

They can be fabricated using semiconductor technology. MEMS piezoresistive force sensors can either be single-axis force sensors or multi-axis force sensors. Multi-axis force sensors are designed to measure the force in two or more spatial directions simultaneously. They are used in applications that require measurements of multi-directional forces such as robot hands which need to be equipped with sensors capable of measuring forces in the x, y, and z directions simultaneously.

MEMS force sensor structures are compact in size and easy to manufacture. Current MEMS three-axis force sensors use beam-based elastic structure designs. However, such structures can easily break. Furthermore, such designs require many electrical contacts which makes miniaturization a challenge. Therefore, making a robust MEMS three-axis force sensor that is small in size requires modifying the device design and minimizing the number of contact points.

SUMMARY

In some aspects, the techniques described herein relate to a multi-axis force sensor including: a flexible element including a center, a top surface, a bottom surface, one or more edges, a central area surrounding the center, and a peripheral area adjacent to the one or more edges; and a mass element located on the top surface of the flexible element in the central area such that the flexible element bends in a direction when a force acts on the mass element; wherein the flexible element defines a horizontal xy-plane and a vertical z-direction which is perpendicular to the horizontal xy-plane; and wherein the flexible element has a multilayer structure including a dielectric layer forming the bottom surface of the flexible element and a semiconductor layer on top of the dielectric layer.

The disclosure is based on the idea of building a three-axis piezoresistive force sensor where a mass element is located on a plane flexible element and where piezoresistors arrangements and various electrical biasing configurations allow to reduce the number of electrical contacts. This provides improvements in device reliability and offers possibility for size reduction.

Additional advantages and novel features of the system of the present disclosure will be set forth in part in the description that follows, and in part will become more apparent to those skilled in the art upon examination of the following or upon learning by practice of the disclosure.

BRIEF DESCRIPTION OF THE DRAWINGS

In the descriptions that follow, like parts are marked throughout the specification and drawings with the same numerals, respectively. The drawings are not necessarily drawn to scale and certain drawings may be shown in exaggerated or generalized form in the interest of clarity and conciseness. The disclosure itself, however, as well as a mode of use, further features and advances thereof, will be understood by reference to the following detailed description of illustrative implementations of the disclosure when read in conjunction with reference to the accompanying drawings, wherein.

DETAILED DESCRIPTION

Figure 1:
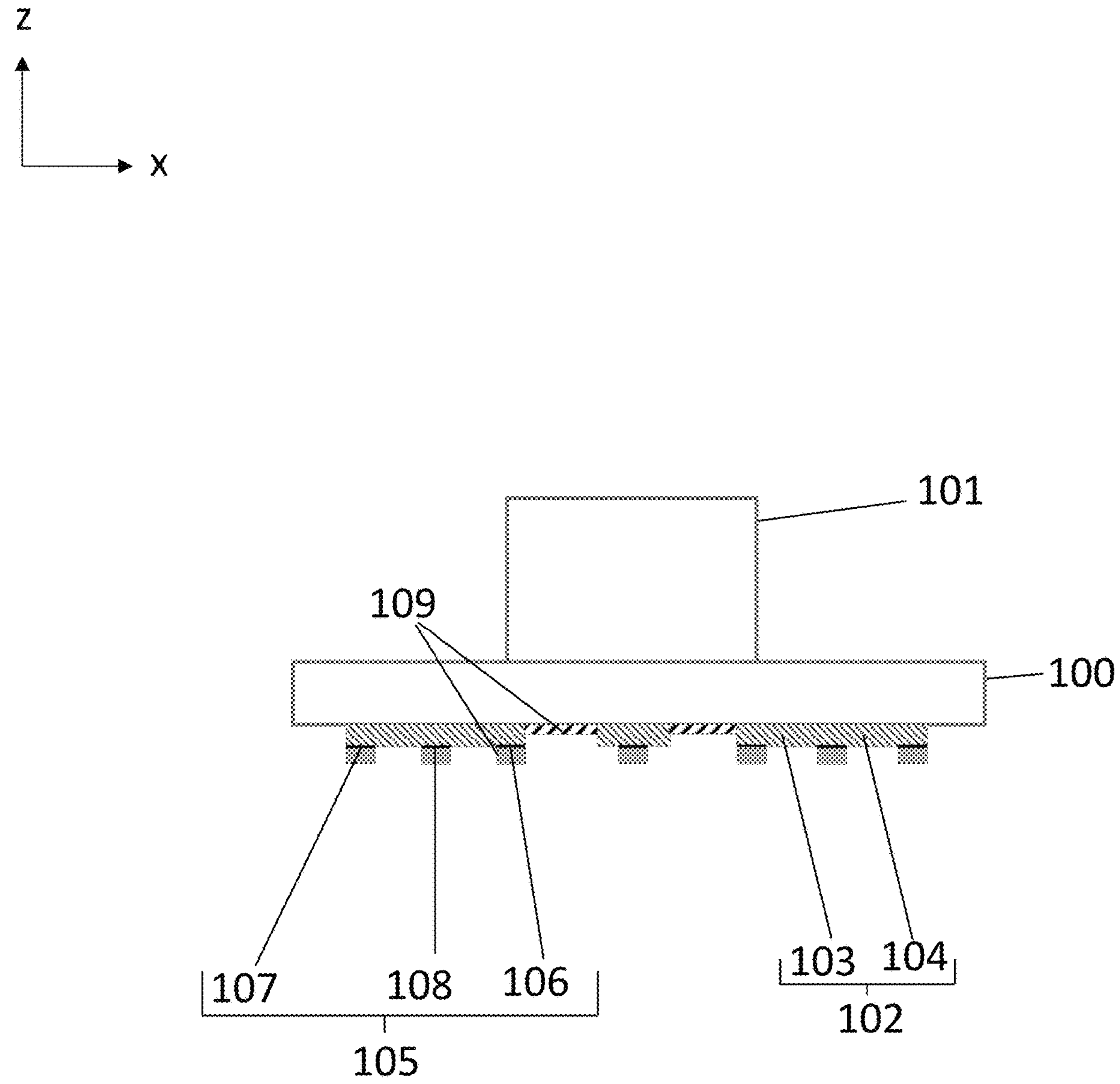
FIG. 1 illustrates an example of a sectional view of a multi-axis force sensor in accordance with an exemplary aspect of the present disclosure.

The disclosure describes a multi-axis force sensor comprising a flexible element, wherein the flexible element has a center and one or more edges and wherein the flexible element comprises a central area surrounding the center and a peripheral area adjacent to the one or more edges. The flexible element defines a horizontal xy-plane and a vertical z-direction which is perpendicular to the xy-plane, and the flexible element has a top surface and a bottom surface. The multi-axis force sensor further comprises a mass element, wherein the mass element is located on the top surface of the flexible element in the central area so that the flexible element bends in a particular direction when a force acts on the mass element. The multi-axis force sensor further comprises at least three pairs of piezoresistors wherein the pairs of piezoresistors are located on the bottom surface of the flexible element, and the pairs of piezoresistors are symmetrically arranged in the xy-plane around the center of the flexible element so that each pair of piezoresistors has an end in the central area of the flexible element and another end in the peripheral area of the flexible element. Each pair of piezoresistors comprises an inner piezoresistor and an outer piezoresistor connected in series, and each pair of piezoresistors comprises a set of contact points. The set of contact points comprises a central contact point in the central area of the flexible element, a peripheral contact point in the peripheral area of the flexible element, and a middle contact point between the inner piezoresistor and the outer piezoresistor so that the inner piezoresistor is connected between the central contact point and the middle contact point, and the outer piezoresistor is connected between the middle contact point and the peripheral contact point. The multi-axis force sensor further comprises a set of electrical connections, and the set of electrical connections brings to each set of contact points a measurement contact, a high-voltage contact, and a low-voltage contact. Each measurement contact is brought to the middle contact point in the set of contact points. The multi-axis force sensor may be a three-axis sensor. The mass element, which may also be called a rigid post element, transmits the applied mechanical force in the x-direction (Fx), y-direction (Fy) and z-direction (Fz) to the flexible element. Each measurement contact is used to measure the voltage at the middle contact which is connected to it.

The plane defined by the x- and y-axes is parallel to the plane of the flexible element in the rest position, i.e., when no force acts on the mass element. The direction defined by the z-axis is perpendicular to the same flexible element. The multi-axis force sensor is intended to be mounted, for example onto an external object. The flexible element could be attached to the surface of the external object. That external object could be oriented in any manner. Words such as "bottom" and "top", "above", "below", "horizontal" and "vertical" do not refer to the orientation of the device with regard to the direction of earth's gravitational field either when the device is manufactured or when it is in use. The expressions "above" and "below" refer here to positions along the z-axis. The expression "horizontal" refers here to a position that is parallel to the xy-plane, whereas the expression "vertical" refers to a position that is perpendicular to the xy-plane.

FIG. 1 illustrates an example of a sectional view of a multi-axis force sensor. The multi-axis force sensor comprises a flexible element 100 to which a mass element 101 is attached. The multi-axis force sensor further comprises at least three pairs of piezoresistors 102 located on the bottom surface of the flexible element 100. Each pair of piezoresistors 102 comprises an inner piezoresistor 103 and an outer piezoresistor 104 connected in series. Each pair of piezoresistors 102 further comprises a set of contact points 105. The set of contact points 105 comprises a central contact point 106, a peripheral contact point 107 and a middle contact point 108. The multi-axis force sensor further comprises a set of electrical connections 109.

Figure 2A:
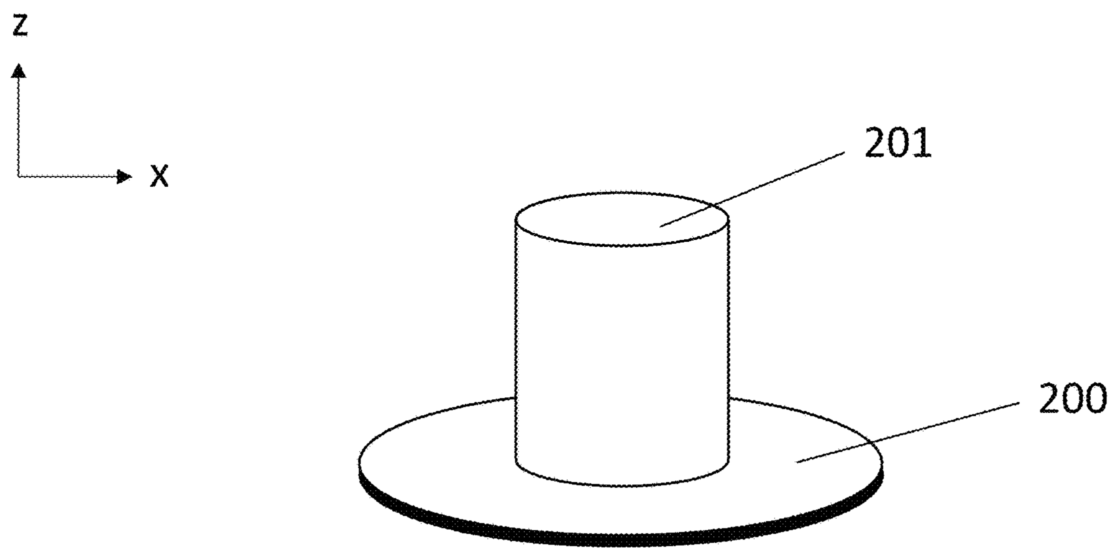
FIG. 2*a* illustrates a possible architecture of a multi-axis force sensor comprising a mass element located on a flexible element, the flexible element has a circular shape in accordance with an exemplary aspect of the present disclosure.

FIG. 2*a* illustrates schematically a possible architecture of a multiple-axis sensor comprising three pairs of piezoresistors. The sensor comprises a flexible element 200 and a mass element 201 located on the top surface, central area, of the flexible element 200. The flexible element 200 has a circular shape whereas the mass element 201 has a cylindrical shape. Reference numbers 200 and 201 in FIG. 2*a* correspond to reference numbers 100 and 101, respectively, in FIG. 1.

Figure 2B:
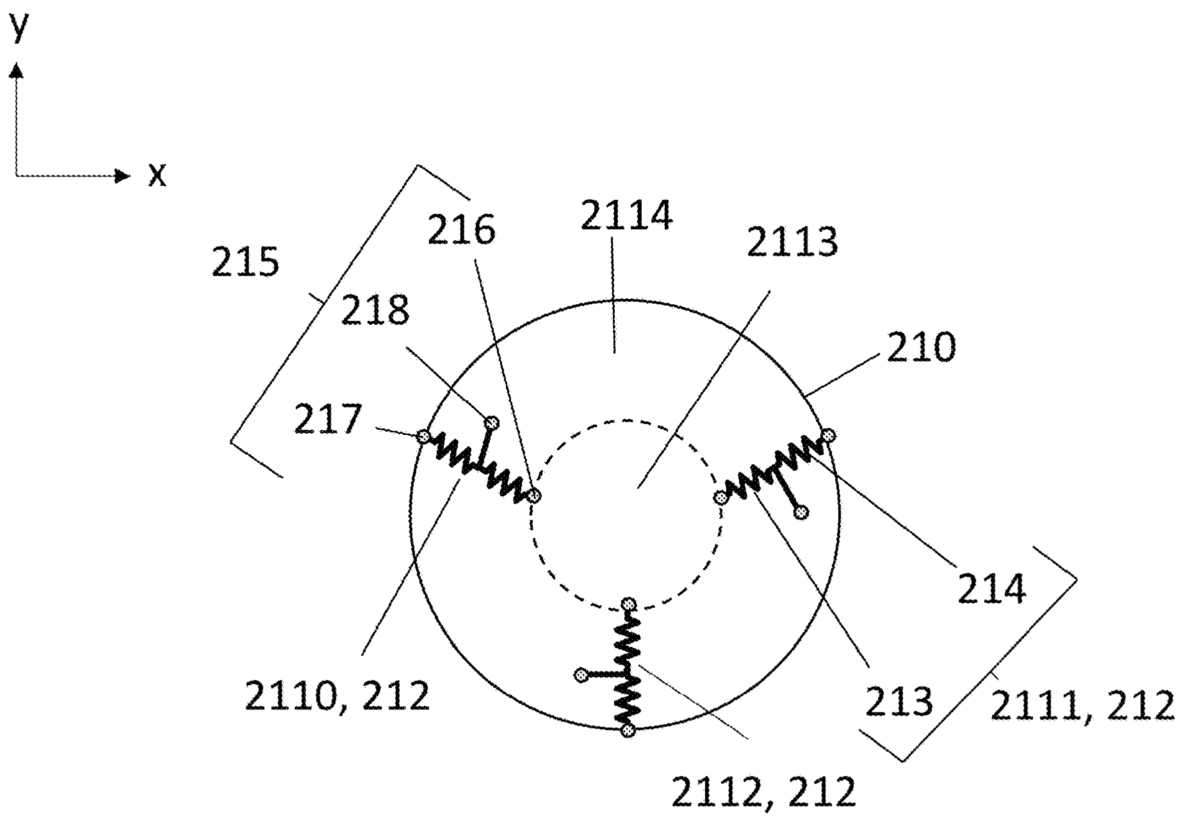
FIG. 2*b* illustrates a scheme of the bottom view of the flexible element with a circular shape in a multi-axis force sensor, the multi-axis force sensor comprises three pairs of piezoresistors in accordance with an exemplary aspect of the present disclosure.

FIG. 2*b* illustrates a scheme of the bottom view of the flexible element 210 having a circular shape. The multi-axis force sensor comprises a first pair of piezoresistors 2110, a second pair of piezoresistors 2111, and a third pair of piezoresistors 2112. Each pair of piezoresistors 212 comprises an inner piezoresistor 213 and an outer piezoresistor 214 connected in series. The pairs of piezoresistors 212 are symmetrically arranged in the xy-plane around the center of the flexible element 210 so that each pair of piezoresistors has an end in the central area of the flexible element 2113 and another end in the peripheral area of the flexible element 2114. In other words, the first pair of piezoresistors 2110 forms a 120° angle with the second pair of piezoresistors

2111, and the second pair of piezoresistors 2111 forms a 120° angle with the third pair of piezoresistors 2112. Each pair of piezoresistors 212 also comprises a set of contact points 215 which comprises a central contact point 216, a peripheral contact point 217, and a middle contact point 218 between the inner piezoresistor 213 and the outer piezoresistor 214. Reference number 210, 212, 213, 214, 215, 216, 217 and 218 in FIG. 2*b* correspond to reference numbers 100, 102, 103, 104, 105, 106, 107 and 108, respectively, in FIG. 1.

Figure 3A:
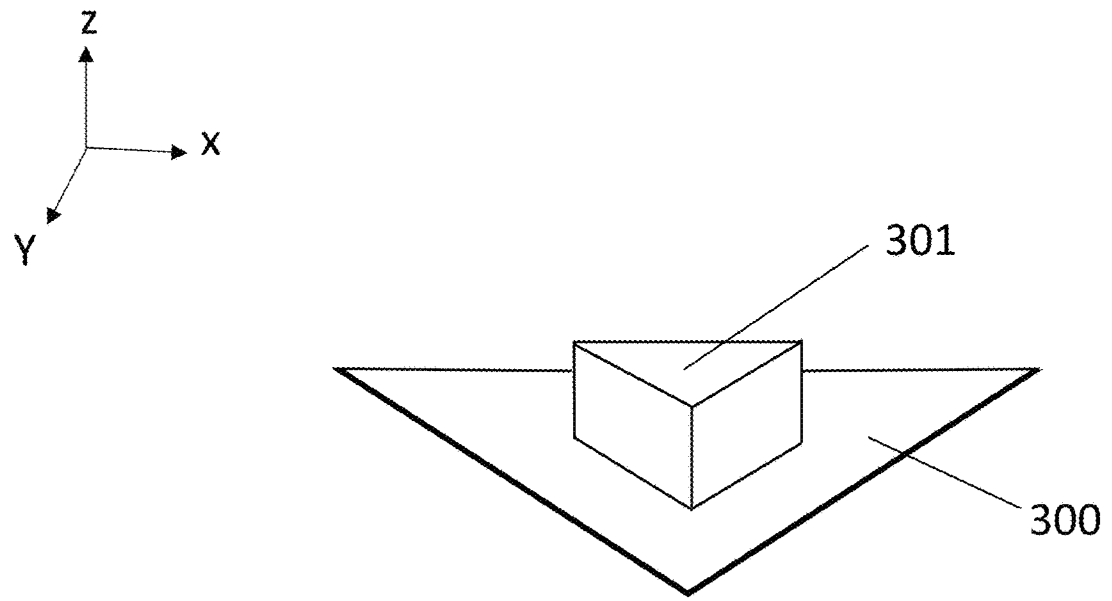
FIG. 3*a* illustrates a possible architecture of a multi-axis force sensor comprising a mass element located on a flexible element, the flexible element has a triangle shape in accordance with an exemplary aspect of the present disclosure.

FIG. 3*a* illustrates schematically another possible architecture of a multiple-axis sensor comprising three pairs of piezoresistors. The sensor comprises a flexible element 300 and a mass element 301 located on the top surface of the flexible element 300. The flexible element 300 has a triangular shape whereas the mass element 301 has a triangular prism shape. Reference numbers 300, 301 in FIG. 3*a* correspond to reference numbers 200, 201, respectively, in FIG. 2*a* and to reference numbers 100, 101, respectively, in FIG. 1.

Figure 3B:
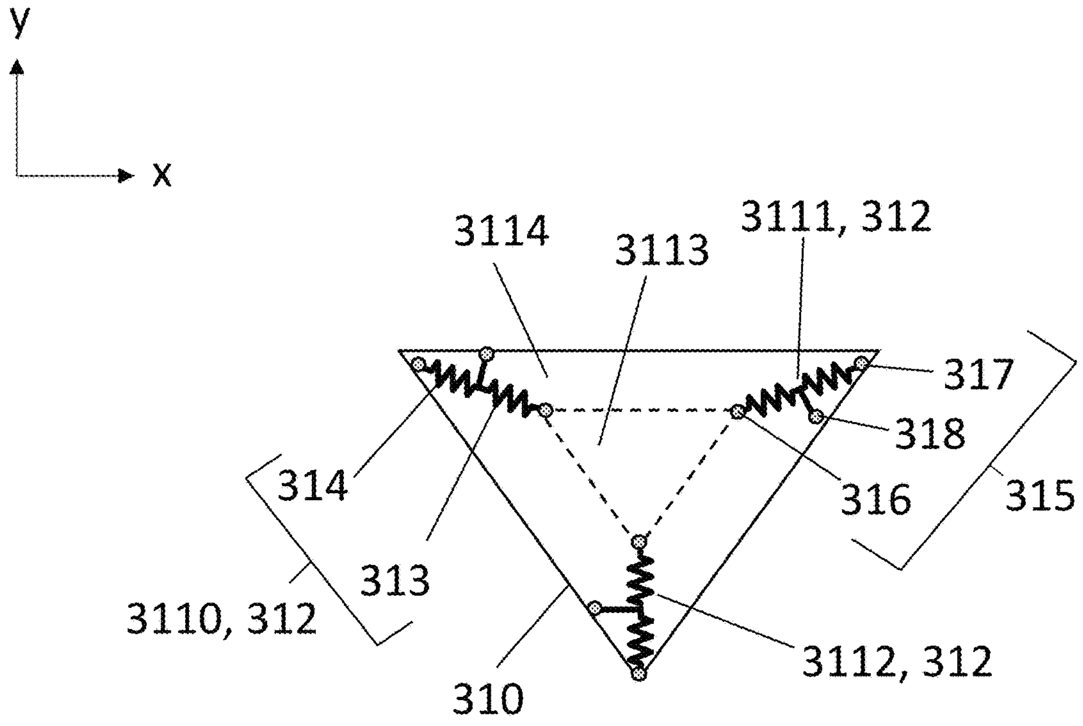
FIG. 3*b* illustrates a scheme of the bottom view of the flexible element with a triangle shape in a multi-axis force sensor, the multi-axis force sensor comprises three pairs of piezoresistors in accordance with an exemplary aspect of the present disclosure.

FIG. 3*b* illustrates a scheme of the bottom view of the flexible element 310 having a triangular shape. The multi-axis force sensor comprises a first pair of piezoresistors 3110, a second pair of piezoresistors 3111, and a third pair of piezoresistors 3112. Each pair of piezoresistors 312 comprises an inner piezoresistor 313 and an outer piezoresistor 314 connected in series. The pairs of piezoresistors 312 are symmetrically arranged in the xy-plane around the center of the flexible element 310 so that each pair of piezoresistors has an end in the central area of the flexible element 3113 and another end in the peripheral area of the flexible element 3114. In other words, the first pair of piezoresistors 3110 forms a 120° angle with the second pair of piezoresistors 3111, and the second pair of piezoresistors 3111 forms a 120° angle with the third pair of piezoresistors 3112. Each pair of piezoresistors 312 also comprises a set of contact points 315 which comprises a central contact point 316, a peripheral contact point 317, and a middle contact point 318. Reference numbers 310, 312, 313, 314, 315, 316, 317, 318, 3110, 3111 and 3112 in FIG. 3*b* correspond to reference numbers 210, 212, 213, 214, 215, 216, 217, 218, 2110, 2111 and 2112, respectively, in FIG. 2*b*.

Figure 4A:
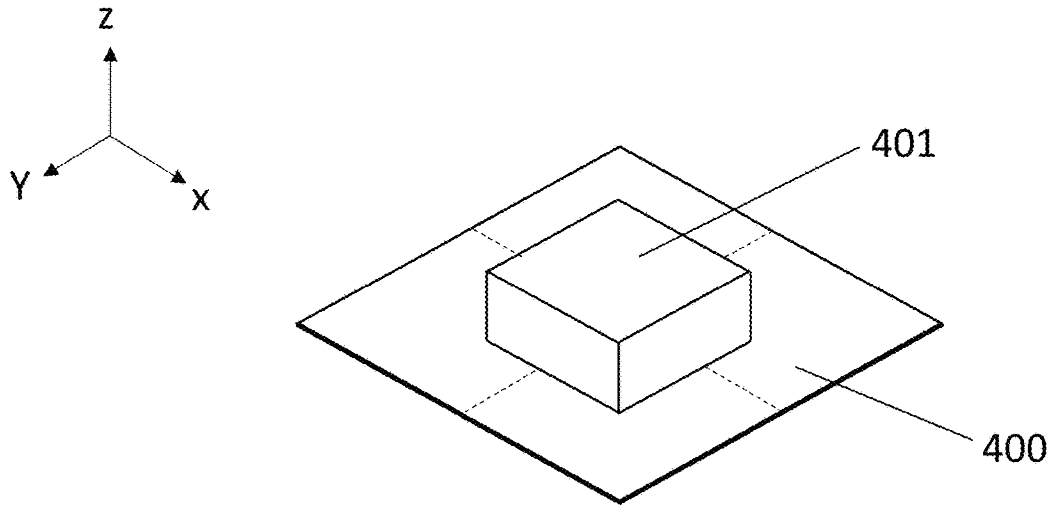
FIG. 4*a* illustrates a possible architecture of a multi-axis force sensor comprising a mass element located on a flexible element, the flexible element has a square shape in accordance with an exemplary aspect of the present disclosure.

FIG. 4*a* illustrates schematically a possible architecture of a multiple-axis sensor comprising four pairs of piezoresistors. The sensor comprises a flexible element 400 and a mass element 401 located on the top surface, central area, of the flexible element 400. The flexible element 400 has a square shape whereas the mass element 401 has a cuboid shape. The mass element 401 may have a cubic shape. Reference numbers 400, 401 in FIG. 4*a* correspond to reference numbers 200, 201, respectively, in FIG. 2*a* and to reference numbers 300, 301, respectively, in FIG. 3*a*.

Figure 4B:
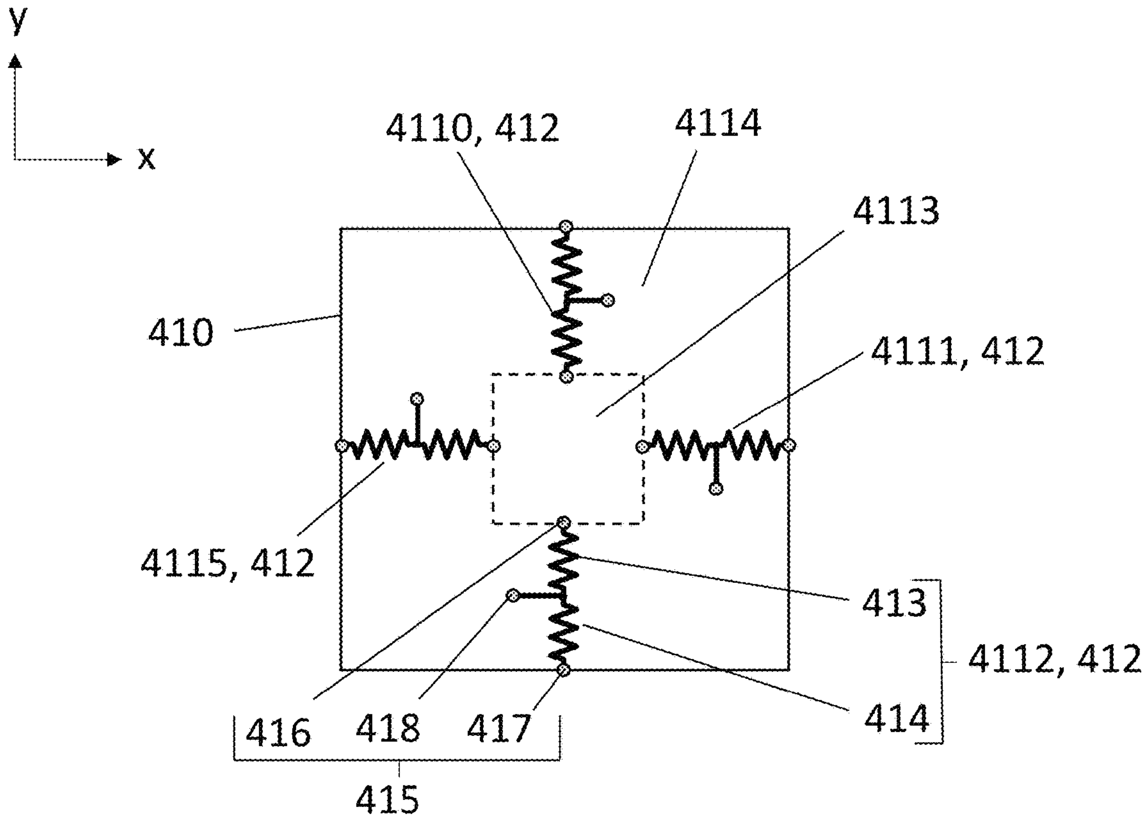
FIG. 4*b* illustrates a scheme of the bottom view of the flexible element with a square shape in a multi-axis force sensor, the multi-axis force sensor comprises four pairs of piezoresistors in accordance with an exemplary aspect of the present disclosure.

FIG. 4*b* illustrates a scheme of the bottom view of the flexible element 410 having a square shape. The multi-axis force sensor comprises a first pair of piezoresistors 4110, a second pair of piezoresistors 4111, a third pair of piezoresistors 4112 and a fourth pair of piezoresistors 4115. Each pair of piezoresistors 412 comprises an inner piezoresistor 413 and an outer piezoresistor 414 connected in series. The pairs of piezoresistors 412 are symmetrically arranged in the xy-plane around the center of the flexible element 410 so that each pair of piezoresistors 412 has an end in the central area of the flexible element 4113 and another end in the peripheral area of the flexible element 4114. In other words, the first pair of piezoresistors 4110 and the third pair of piezoresistors 4112 are arranged opposite to each other on different sides of the central section, simultaneously, the second pair of piezoresistors 4111 and the fourth pair of piezoresistors 4115 are also arranged opposite to each other on different sides of the central section. The first pair of piezoresistors 4110 forms a 90° angle with the second pair of piezoresistors 4111, the second pair of piezoresistors 4111 forms a 90° angle with the third pair of piezoresistors 4112, and the third pair of piezoresistors 4112 forms a 90° angle with the fourth pair of piezoresistors 4115. In this example, the first pair of piezoresistors 4110 and the third pair of piezoresistors 4112 are substantially aligned along the y-axis whereas the second pair of piezoresistors 4111 and the fourth pair of piezoresistors 4115 are substantially aligned along the x-axis. Each pair of piezoresistors 412 also comprises a set of contact points 415 which comprises a central contact point 416, a peripheral contact point 417, and a middle contact point 418 between the inner piezoresistor 413 and the outer piezoresistor 414. Reference numbers 410, 412, 413, 414, 415, 416, 417 and 418 in FIG. 4*b* correspond to reference numbers 210, 212, 213, 214, 215, 216, 217 and 218, respectively, in FIG. 2*b* and to reference numbers 310, 312, 313, 314, 315, 316, 317 and 318, respectively, in FIG. 3*b*.

The multi-axis force sensor may further comprise a substrate below the piezoresistors. All electrical connections in the set of electrical connections may extend from the substrate to the sets of contact points.

Figure 5:
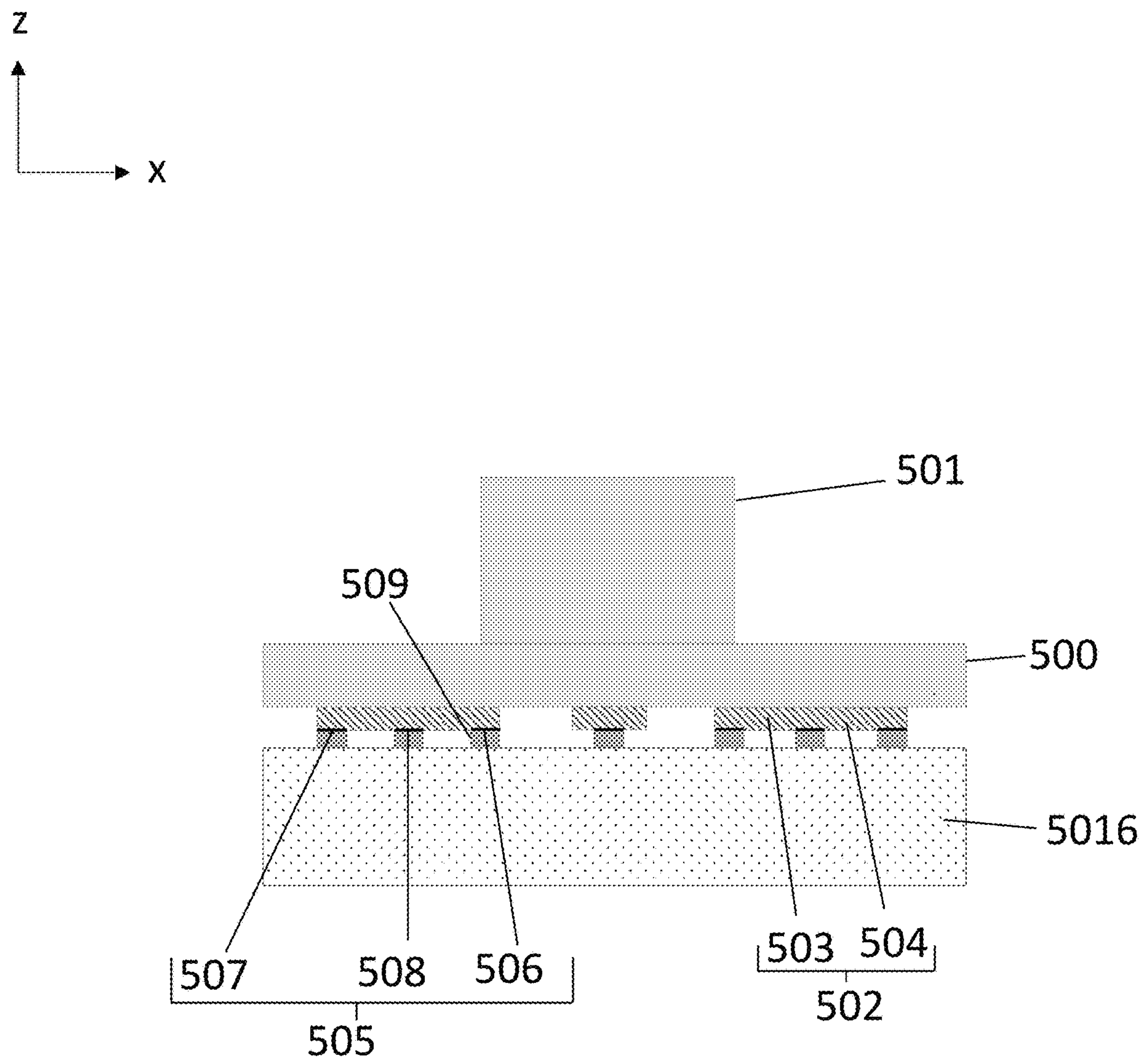
FIG. 5 illustrates an example of a side view of a multi-axis force sensor comprising a substrate, the set of electrical connections extends from the substrate to the set of contact points in accordance with an exemplary aspect of the present disclosure.

FIG. 5 illustrates an example of a side view of a multi-axis force sensor comprising a substrate 5016 arranged below a flexible element 500 and a mass element 501 located on the top surface of the flexible element 500. The flexible element 500 may have a square shape whereas the mass element 501 may have a cuboid shape. Alternatively, the flexible element 500 may have another shape such as circular or triangle shape whereas the mass element 501 may have another shape such as cubic, cylindrical, or triangular prism shape. The device shown in FIG. 5 can be implemented with any of the aspects shown in FIGS. 2-4. The multi-axis force sensor further comprises at least three pairs of piezoresistors 502 comprising an inner piezoresistor 503 and an outer piezoresistor 504 connected in series. The substrate 5016 is electrically connected to the pairs of piezoresistors 502 through a set of electrical connections 509. The set of electrical connections 509 extends from the substrate 5016 to the set of contact points 505. Reference numbers 500, 501 in FIG. 5 correspond to reference numbers 200, 201, respectively, in FIG. 2*a* and to reference numbers 300, 301, respectively, in FIG. 3*a*, and to reference numbers 400, 401, respectively, in FIG. 4*a*. Reference numbers 502, 503, 504, 505, 506, 507, 508 correspond to reference numbers 212, 213, 214, 215, 216, 217, 218, respectively, in FIG. 2*b*, and to reference numbers 312, 313, 314, 315, 316, 317, 318, respectively, in FIG. 3*b*, and to reference numbers 412, 413, 414, 415, 416, 417, 418, respectively, in FIG. 4*b*.

When a force acts on the multi-axis force sensor, the flexible element bends inducing stress in the piezoresistors. Depending on the force direction and consequently on the bending direction, the electrical resistance of the piezoresistors changes. The change in electrical resistance may be measured using an electric bridge in which the piezoresistors can be electrically biased through the set of electrical connections. The change in electrical resistance can be after that converted into a measurable output voltage.

Figure 6A:
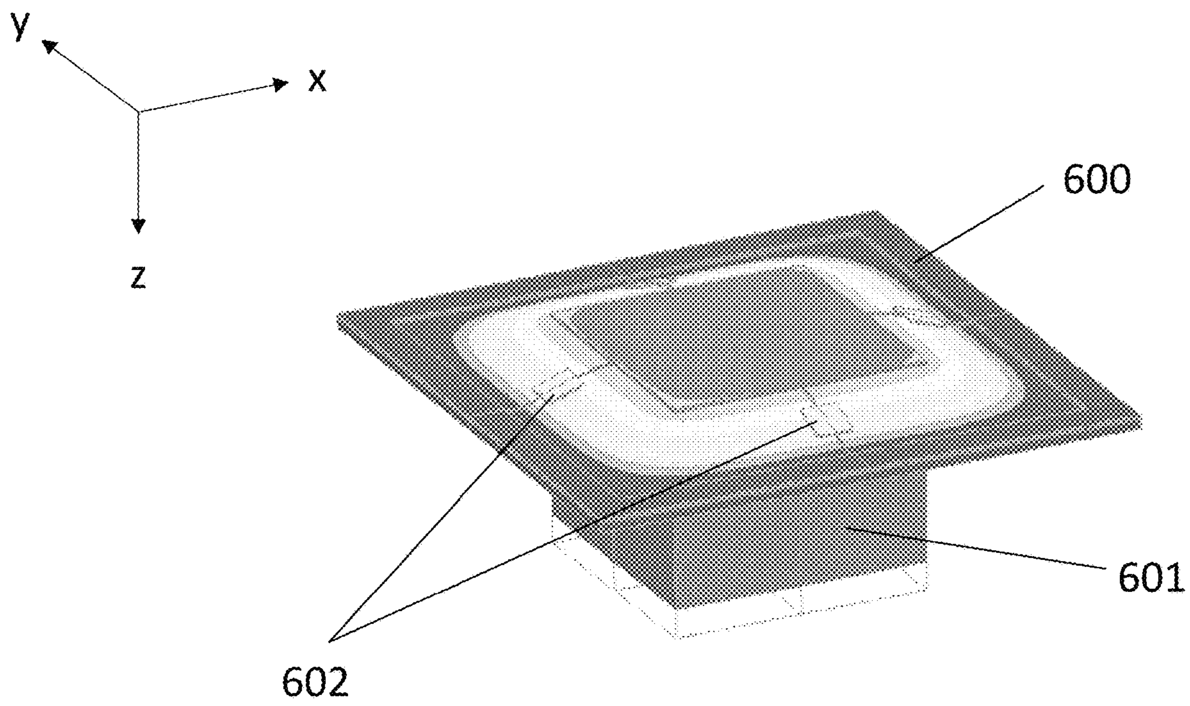
FIG. 6*a* illustrates a multi-axis force sensor subjected to a force applied along the z-axis in accordance with an exemplary aspect of the present disclosure.

FIG. 6*a* illustrates a multi-axis force sensor subjected to a force applied along the z-axis. The multi-axis force sensor comprises a mass element 601 attached to a flexible element 600. The multi-axis force sensor further comprises pairs of piezoresistors 602 located on the bottom surface of the flexible element 600. When the force acts on the mass element 601 along the z-axis, the flexible element 600 flexes leading to a change in the electrical resistance of the piezoresistors 602. Reference numbers 600 and 601 in FIG. 6*a* correspond to reference numbers 400 and 401, respectively, in FIG. 4*a*. Reference number 602 in FIG. 6*a* corresponds to reference number 412 in FIG. 4*b*.

Figure 6B:
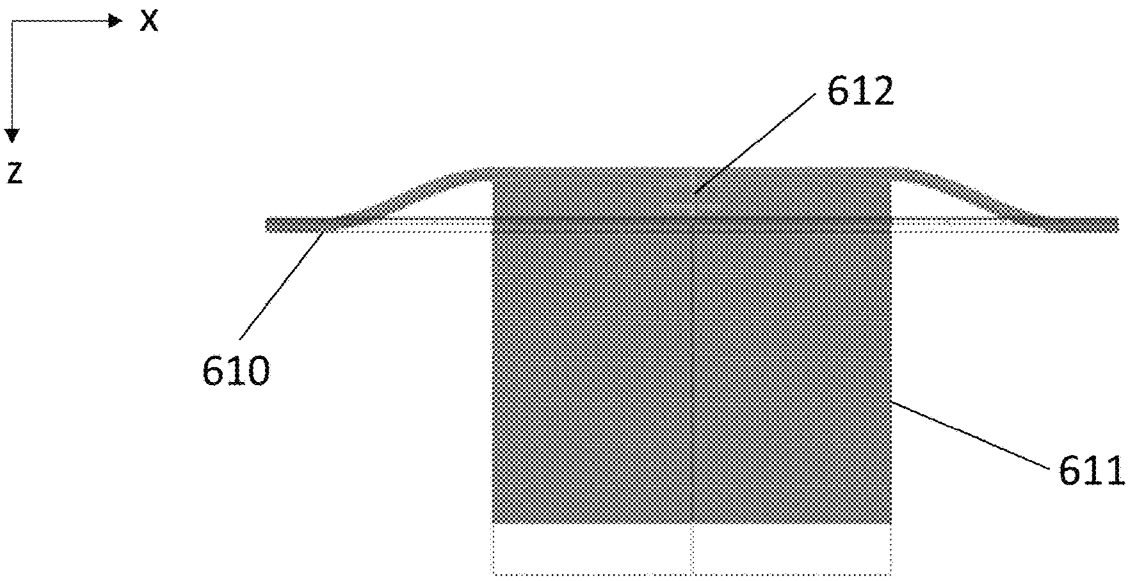
FIG. 6*b* illustrates a side view of the multi-axis force sensor which is subjected to a force applied along the z-axis in accordance with an exemplary aspect of the present disclosure.

FIG. 6*b* illustrates a side view of the multi-axis force sensor which is subjected to a force applied along the z-axis. The force applied on the mass element 611 results in the bending of the flexible element 610 and the piezoresistors 612 in the z-direction. Reference numbers 610, 611 and 612 in FIG. 6*b* correspond to reference numbers 600, 601 and 602, respectively, in FIG. 6*a*.

Figure 7A:
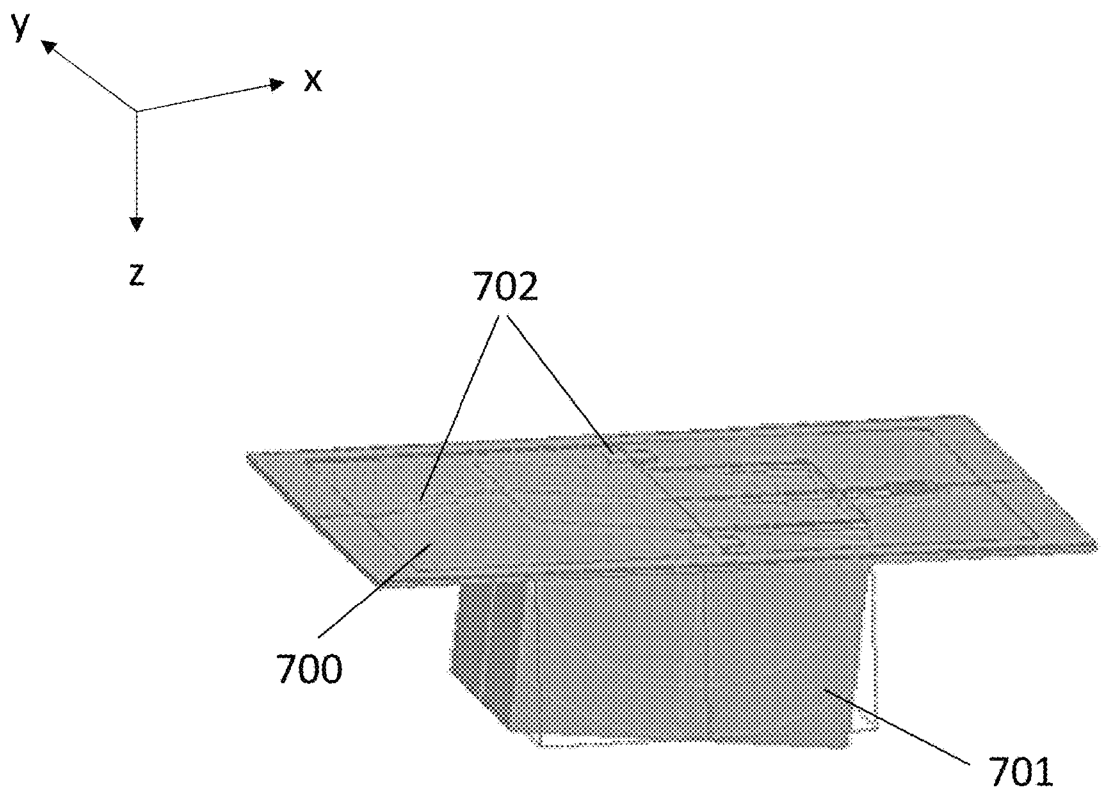
FIG. 7*a* illustrates a multi-axis force sensor subjected to a force applied along the x-axis in accordance with an exemplary aspect of the present disclosure.

FIG. 7*a* illustrates a multi-axis force sensor subjected to a force applied along the x-axis. The multi-axis force sensor comprises a mass element 701 attached to a flexible element 700. The multi-axis force sensor further comprises pairs of piezoresistors 702 located on the bottom surface of the flexible element 700. When the force acts on the mass element 701 along the x-axis, the flexible element 700 bends in the xz-plane leading to a change in the electrical resistance of the piezoresistors 702. Reference numbers 700, 701 and 702 in FIG. 7*a* correspond to reference numbers 600, 601 and 602, respectively, in FIG. 6*a*.

Figure 7B:
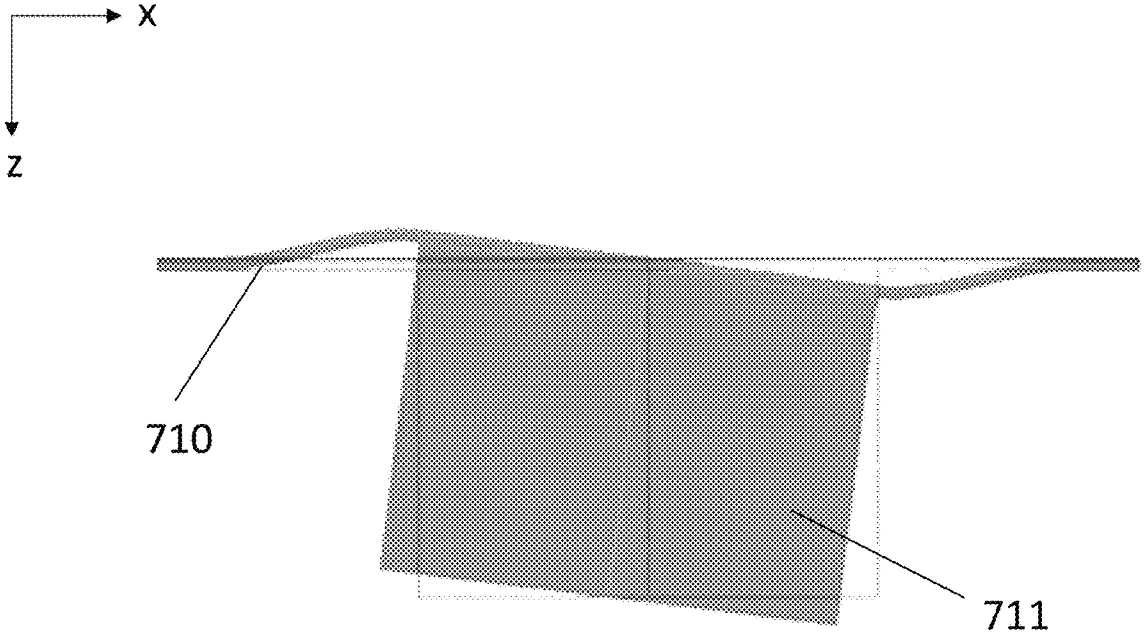
FIG. 7*b* illustrates a side view of the multi-axis force sensor which is subjected to a force applied along the x-axis in accordance with an exemplary aspect of the present disclosure.

FIG. 7*b* illustrates a side view of the multi-axis force sensor which is subjected to a force applied along the x-axis. The force applied on the mass element 711 results in the bending of the flexible element 710 in the xz-plane. Reference numbers 710 and 711 in FIG. 7*b* correspond to reference numbers 700 and 701, respectively, in FIG. 7*a*.

Each pair of piezoresistors is connected to one measurement contact. Each pair of piezoresistors may be connected to an independent high voltage contact and to an independent low voltage contact. Alternatively, each pair of piezoresistors may be connected to a shared high voltage contact and/or a shared low voltage contact. "Independent high voltage contact" refers to an arrangement in which the contact points are electrically connected to separate high voltage contacts. "Independent low voltage contact" refers to an arrangement in which the contact points are electrically connected to separate low voltage contacts. "Shared high voltage contact" refers to an arrangement in which the contact points are electrically connected to the same high voltage contact via the electrical connections. "Shared low voltage contact" refers to an arrangement in which the contact points are electrically connected to the same low voltage contact via the electrical connections. These options apply to all aspects in this disclosure.

Figure 8A:
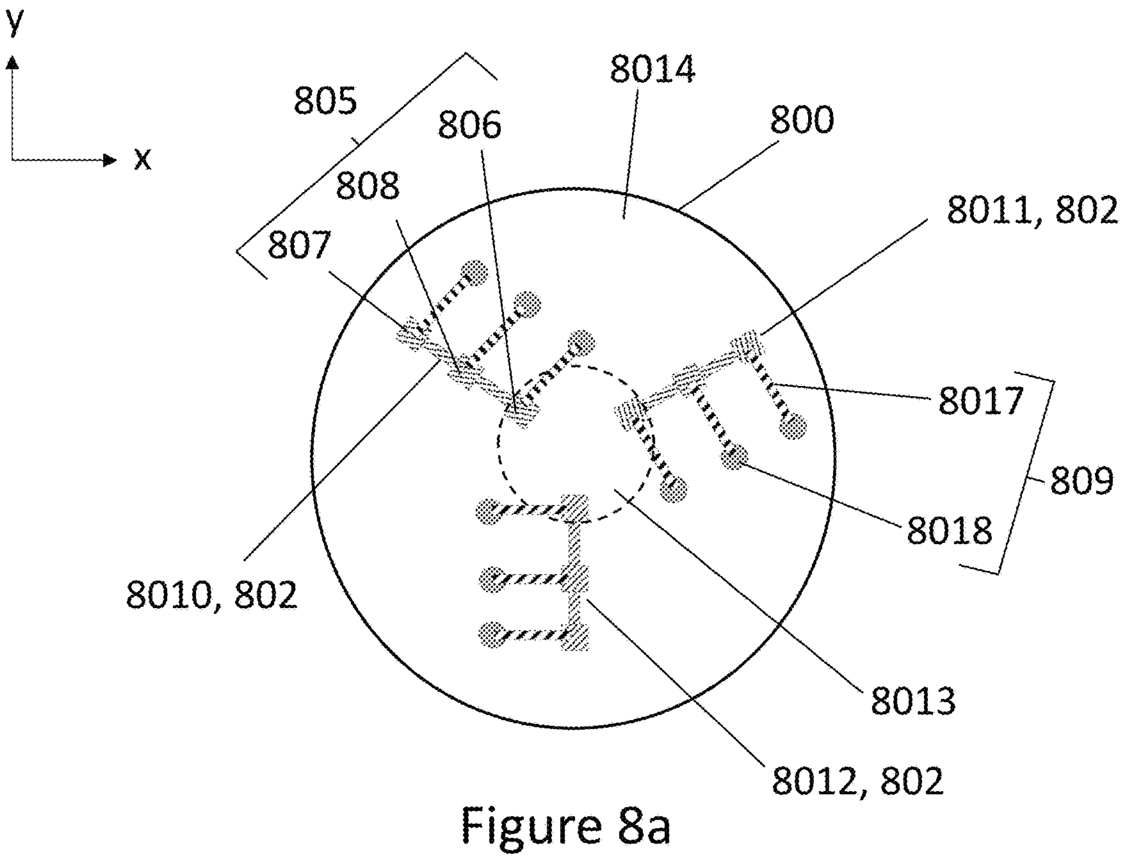
FIG. 8*a* illustrates a possible arrangement of electrical connections in a multi-axis force sensor having three pairs of piezoresistors in accordance with an exemplary aspect of the present disclosure.

FIG. 8*a* illustrates a possible arrangement of electrical connections in a multi-axis force sensor having three pairs of piezoresistors 802. The multi-axis force sensor comprises a first pair of piezoresistors 8010, a second pair of piezoresistors 8011, and a third pair of piezoresistors 8012. The pairs of piezoresistors 802 are symmetrically arranged in the xy-plane around the center of the flexible element 800 so that each pair of piezoresistors has an end in the central area of the flexible element 8013 and another end in the peripheral area of the flexible element 8014. In other words, the first pair of piezoresistors 8010 forms a 120° angle with the second pair of piezoresistors 8011, and the second pair of piezoresistors 8011 forms a 120° angle with the third pair of piezoresistors 8012. Each pair of piezoresistors 802 comprises a set of contact points 805 which comprises a central contact point 806, a peripheral contact point 807, and a middle contact point 808. The multi-axis force sensor further comprises a set of electrical connections 809 which may comprise a subset of in-plane connections 8017 laid in the xy-plane and a subset of out-of-plane connections 8018 extending along the z-axis. Alternatively, the set of electrical connections 809 could comprise only out-of-plane 8018 connections.

The set of electrical connections 809 may be made of a variety of metals that include but are not limited to Al, Cu, Ag, Au, Pt, Pd, Mo or metal alloys. They may be formed by a variety of deposition methods such as sputtering, chemical vapor deposition, molecular beam epitaxy, electron beam physical vapor evaporation, or laser metal deposition. These options apply to all aspects in this disclosure. For example, on one hand the peripheral contact points 807 of the first pair, the second pair and the third pair of piezoresistors may be connected to a fixed low voltage contact. On the other hand, the central contact points 806 of the first pair, the second pair, and the third pair of piezoresistors may be connected to a fixed high voltage contact. The low voltage contact may be a ground contact. This option applies to all aspects in this disclosure. Each middle contact point 808 is connected to a measurement contact via the electrical connections 809. The voltage V between a low voltage contact point and high voltage contact point may for example be set at 3, 4, or 5 V. This option applies to all aspects in this disclosure. Reference numbers 800, 802, 805, 806, 807, 808, 8010, 8011 and 8012 in FIG. 8*a* correspond to reference numbers 210, 212, 215, 216, 217, 218, 2110, 2111, and 2112, respectively, in FIG. 2*b* and to reference numbers 310, 312, 315, 316, 317, 318, 3110, 3111 and 3112, respectively, in FIG. 3*b*.

When no force acts on the mass element, the voltage value V0 at the middle contact point between the inner piezoresistor and the outer piezoresistor in each pair of piezoresistors equals:

$$V0 = \frac{1}{2}V$$

When a force is applied on the mass element, a change in the electrical resistance of the piezoresistors leads to a change in the voltage value at the middle contact point in each pair of piezoresistors. Assuming that the applied force bends the flexible element in the z-axis direction, and considering that the initial resistance value of each piezoresistor is R and that the change in the resistance is ΔR, the voltages V1, V2 and V3 at the middle contact point in the first pair of piezoresistors, the second pair of piezoresistors and the third pair of piezoresistors, respectively, are $$V1 = V2 = V3 = \frac{1}{2}V + \frac{1}{2}\frac{\Delta R}{R}V$$

The change in the voltage at the middle contact point in the first pair of piezoresistors, the second pair of piezoresistors and the third pair of piezoresistors can consequently be written as $$\Delta V1 = V1 - V0 = \frac{1}{2}\frac{\Delta R}{R}V$$

$$\Delta V2 = V2 - V0 = \frac{1}{2}\frac{\Delta R}{R}V$$

$$\Delta V3 = V3 - V0 = \frac{1}{2}\frac{\Delta R}{R}V$$

Subsequently, the signal voltages in the x-axis, y-axis and z-axis directions can be calculated as follows:

$$Vx = (V2 - V1) = 0$$

$$Vy = \Delta V1 + \Delta V2 - \Delta V3 = \frac{\Delta R}{R}V$$

$$Vz = \Delta V1 + \Delta V2 + \Delta V3 = \frac{3}{2}\frac{\Delta R}{R}V$$

When the applied force bends the flexible element in the y-axis direction, the voltages V1, V2 and V3 at the middle contact point in the first pair of piezoresistors, the second pair of piezoresistors and the third pair of piezoresistors, respectively, are:

$$V1 = \frac{1}{2}V + \frac{1}{2}\frac{\Delta R}{R}V$$

$$V2 = \frac{1}{2}V - \frac{1}{2}\frac{\Delta R}{R}V$$

$$V3 = \frac{1}{2}V$$

The change in the voltage at the middle contact point in the first pair of piezoresistors, the second pair of piezoresistors and the third pair of piezoresistors, respectively, can consequently be written as $$\Delta V1 = V1 - V0 = \frac{1}{2}\frac{\Delta R}{R}V$$

$$\Delta V2 = V2 - V0 = -\frac{1}{2}\frac{\Delta R}{R}V$$

$$\Delta V3 = V3 - V0 = 0$$

Subsequently, the signal voltages in the x-axis, y-axis and z-axis directions can be calculated as $$Vx = \Delta V1 - \Delta V2 = \frac{1}{2}\frac{\Delta R}{R}V$$

$$Vy = \Delta V1 + \Delta V2 - \Delta V3 = 0$$

$$Vz = \Delta V1 + \Delta V2 + \Delta V3 = 0$$

Assuming that the applied force bends the flexible element in the x-axis direction, the voltages V1, V2 and V3 at the middle contact point in the first pair of piezoresistors, the second pair of piezoresistors and the third pair of piezoresistors, respectively, are:

$$V1 = \frac{1}{2}V + \frac{1}{2}\frac{\Delta R}{R}V$$

$$V2 = \frac{1}{2}V + \frac{1}{2}\frac{\Delta R}{R}V$$

$$V3 = \frac{1}{2}V - \frac{1}{2}\frac{\Delta R}{R}V$$

The change in the voltage at the middle contact point in the first pair of piezoresistors, the second pair of piezoresistors and the third pair of piezoresistors, respectively, can consequently be written as $$\Delta V1 = V1 - V0 = \frac{1}{4}\frac{\Delta R}{R}V$$

$$\Delta V2 = V2 - V0 = \frac{1}{4}\frac{\Delta R}{R}V$$

$$\Delta V3 = V3 - V0 = -\frac{1}{2}\frac{\Delta R}{R}V$$

Subsequently, the signal voltages in the x-axis, y-axis and z-axis directions can be calculated as $$Vx = (V1 - V2) = 0$$

$$Vy = \Delta V1 + \Delta V2 - \Delta V3 = \frac{\Delta R}{R}V$$

$$Vz = \Delta V1 + \Delta V2 + \Delta V3 = 0$$

The signal voltages Vx, Vy, and Vz can be captured with an electronic measurement circuit. The measurement circuit may consist of differential and summing amplifiers that directly output the voltages based on input voltages V1, V2, V3, and V0 accordingly. The measurement circuit may also be based on digital processing where input voltages are captured using analogue to digital converters and the signal voltages are computed using a microcontroller.

The at least three pairs of piezoresistors may comprise a first pair of piezoresistors, a second pair of piezoresistors, and a third pair of piezoresistors. The set of electrical connections may comprise a subset of in-plane connections. The peripheral contact points of the first pair, the second pair and the third pair of piezoresistors may be connected to a shared low voltage contact through the subset of in-plane connections, and the central contact points of the first pair, the second pair and the third pair of piezoresistors may be connected to a shared high voltage contact though the subset of in-plane connections.

Figure 8B:
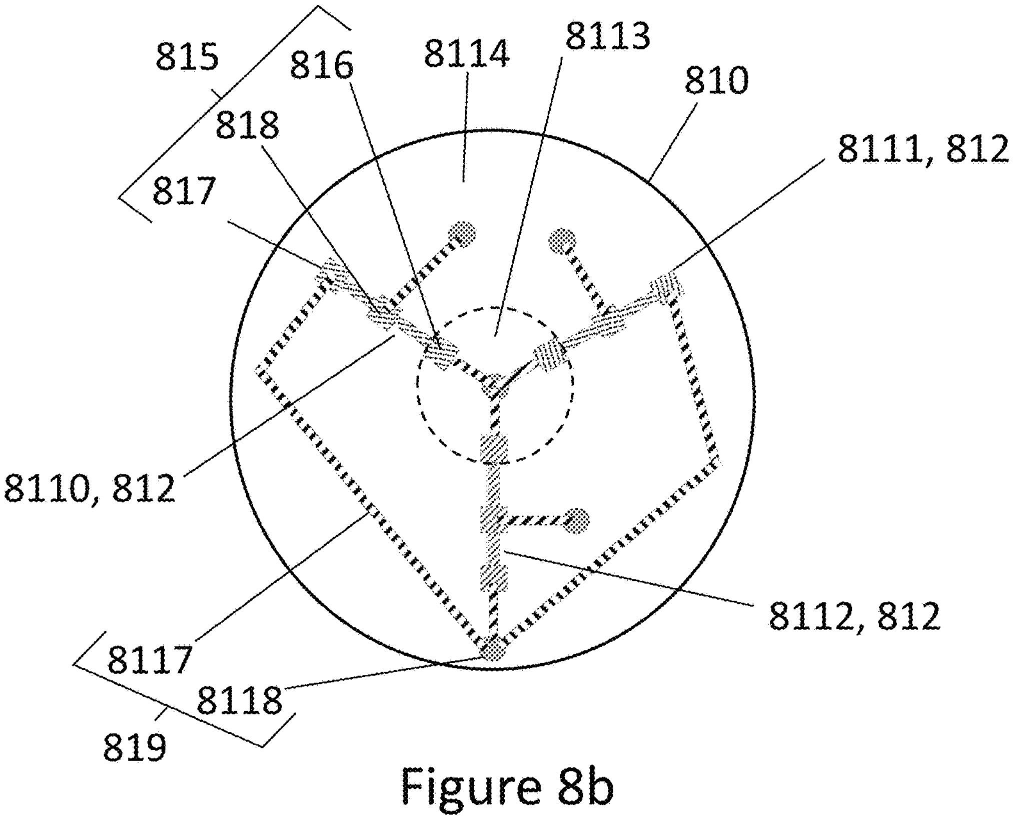
FIG. 8*b* illustrates another possible arrangement of the electrical connections in a multi-axis force sensor having three pairs of piezoresistors in accordance with an exemplary aspect of the present disclosure.

FIG. 8*b* illustrates another possible arrangement of the electrical connections in a multi-axis force sensor having three pairs of piezoresistors 812 which are symmetrically arranged in the xy-plane around the center of the flexible element 810. The multi-axis force sensor further comprises a set of electrical connections 819 which may comprise a subset of in-plane connections 8117 and a subset of out-of-plane connections 8118. On one hand the peripheral contact points 817 of the first pair, the second pair and the third pair of piezoresistors may be connected to a shared low voltage contact and on the other hand, the central contact points 816 of the first pair, the second pair, and the third pair of piezoresistors may be connected to a shared high voltage contact. Each middle contact point 818 is connected to a measurement contact. Reference numbers 810, 812, 815, 816, 817, 818, 8110, 8111, 8112, 8113 and 8114, in FIG. 8*b* correspond to reference numbers 800, 802, 805, 806, 807, 808, 8010, 8011, 8012, 8013, and 8014, respectively, in FIG. 8*a*. The at least three pairs of piezoresistors may comprise a first pair of piezoresistors, a second pair of piezoresistors, a third pair of piezoresistors and a fourth pair of piezoresistors. The first pair and the third pair of piezoresistors are arranged opposite to each other on different sides of the central section, and the second pair and the fourth pair of piezoresistors are arranged opposite to each other on different sides of the central section. The set of electrical connections may comprise a subset of in-plane connections. The peripheral contact points of the first pair and the third pair of piezoresistors and the central contact points of the second pair and the fourth pair of piezoresistors may be connected to a shared low voltage contact through the subset of in-plane connections, and the central contact points of the first pair and the third pair of piezoresistors and the peripheral contact points of the second pair and the fourth pair of piezoresistors may be connected to a shared high voltage contact through the subset of in-plane connections.

Figure 9A:
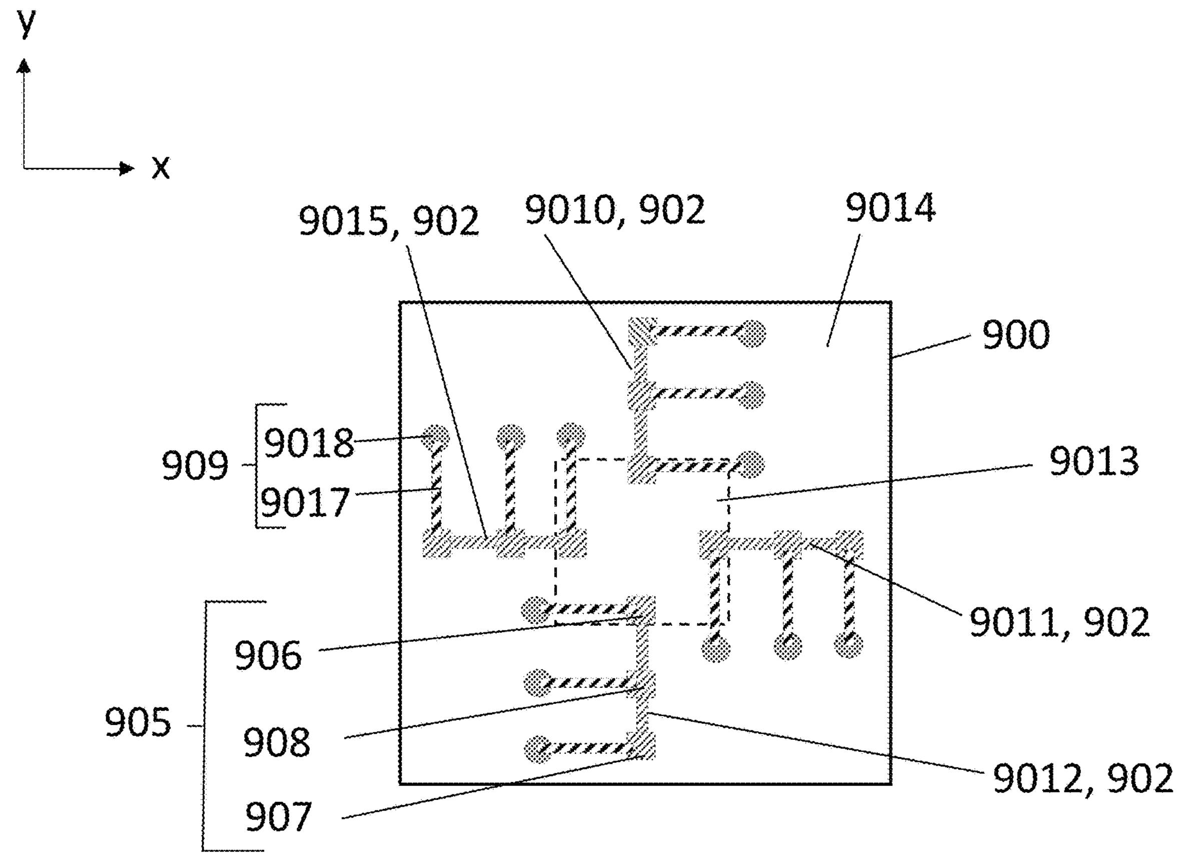
FIG. 9*a* illustrates a possible arrangement of electrical connections in a multi-axis force sensor having four pairs of piezoresistors in accordance with an exemplary aspect of the present disclosure.

FIG. 9*a* illustrates a possible arrangement of electrical connections in a multi-axis force sensor having four pairs of piezoresistors 902. The multi-axis force sensor comprises a first pair of piezoresistors 9010, a second pair of piezoresistors 9011, a third pair of piezoresistors 9012 and a fourth pair of piezoresistors 9015. The pairs of piezoresistors 902 are symmetrically arranged in the xy-plane around the center of the flexible element 900 so that each pair of piezoresistors 902 has an end in the central area of the flexible element 9013 and another end in the peripheral area of the flexible element 9014. In other words, the first pair of piezoresistors 9010 and the third pair of piezoresistors 9012 are arranged opposite to each other on different sides of the central section, simultaneously, the second pair of piezoresistors 9011 and the fourth pair of piezoresistors 9015 are also arranged opposite to each other on different sides of the central section. The first pair of piezoresistors 9010 forms a 90° angle with the second pair of piezoresistors 9011, the second pair of piezoresistors 9011 forms a 90° angle with the third pair of piezoresistors 9012, and the third pair of piezoresistors 9012 forms a 90° angle with the fourth pair of piezoresistors 9015. Each pair of piezoresistors 902 comprises a set of contact points 905 which comprises a central contact point 906, a peripheral contact point 907, and a middle contact point 908. The multi-axis force sensor further comprises a set of electrical connections 909 which may comprise a subset of in-plane connections 9017 and a subset of out-of-plane connections 9018.

For example, the peripheral contact points 907 of the first pair 9010 and the third pair 9012 of piezoresistors and the central contact points 906 of the second pair 9011 and the fourth pair 9015 of piezoresistors may be connected to a low voltage contact. Simultaneously, the central contact points 906 of the first pair 9010 and the third pair 9012 of piezoresistors and the peripheral contact points 907 of the second pair 9011 and the fourth pair 9015 of piezoresistors may be connected to a high voltage contact. Each middle contact point is connected to a measurement contact. In this example, all high voltage and low voltage contacts are independent. Reference numbers 900, 902, 905, 906, 907, 908, 9010, 9011, 9012, 9013, 9014 and 9015 in FIG. 9*a* correspond to reference numbers 410, 412, 415, 416, 417, 418, 4110, 4111, 4112, 4113, 4114 and 4115, respectively, in FIG. 4*b*.

Figure 9B:
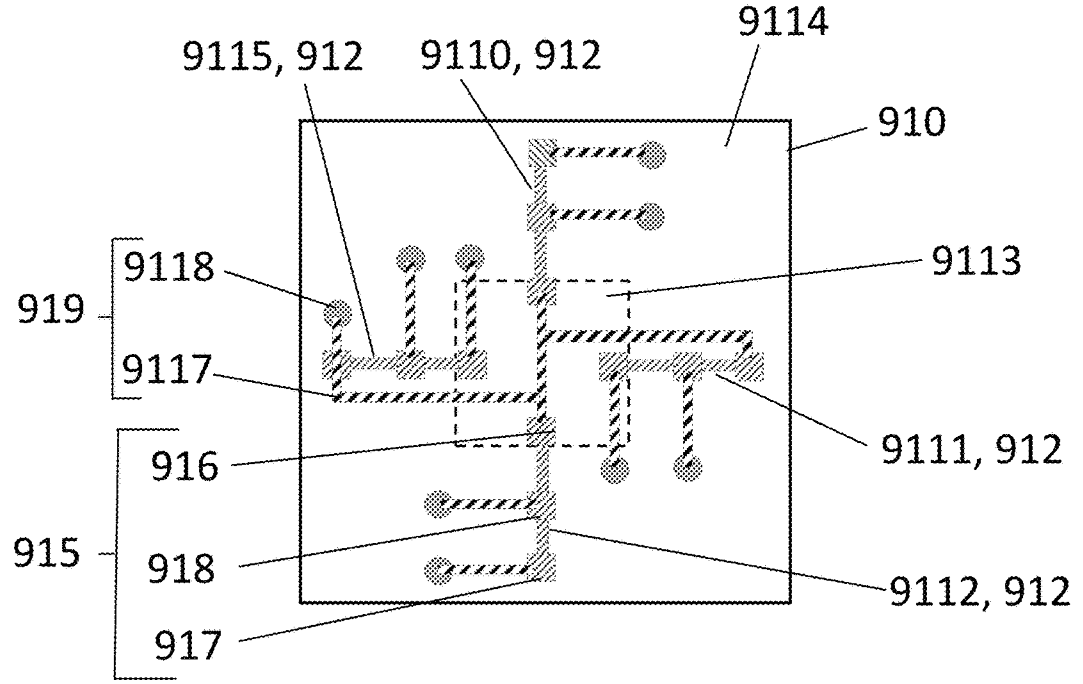
FIG. 9*b* illustrates another possible arrangement of the electrical connections in a multi-axis force sensor having four pairs of piezoresistors in accordance with an exemplary aspect of the present disclosure.

FIG. 9*b* illustrates another possible arrangement of the electrical connections in a multi-axis force sensor having four pairs of piezoresistors 912. The peripheral contact points 917 of the first pair 9110 and the third pair 9112 of piezoresistors and the central contact points 916 of the second pair 9111 and the fourth pair 9115 of piezoresistors may also be connected to a low voltage contact. The central contact points 916 of the first pair 9110 and the third pair 9112 of piezoresistors and the peripheral contact points 917 of the second pair 9111 and the fourth pair 9115 of piezoresistors may be connected to a high voltage contact. The set of electrical connections 919 may comprise a subset of in-plane connections 9117 and a subset of out-of-plane connections 9118. In this example, all low voltage contacts are independent contacts whereas the high voltage contact is a shared contact via the in-plane connections 9117. Each middle contact point 918 is connected to a measurement contact via the electrical connections 919. Reference numbers 910, 912, 915, 916, 917, 918, 9110, 9111, 9112, 9113, 9114 and 9115 in FIG. 9*b* correspond to reference numbers 900, 902, 905, 906, 907, 908, 9010, 9011, 9012, 9013, 9014 and 9015, respectively, in FIG. 9*a*.

When no force acts on the mass element, the voltage value at the middle contact point between the inner piezoresistor and the outer piezoresistor in each pair of piezoresistors V0 equals:

$$V0 = \frac{1}{2}V$$

When a force is applied on the mass element, a change in electrical resistance of the piezoresistors leads to a change in the voltage value at the middle contact point in each pair of piezoresistors. Assuming that the applied force bends the flexible element in the z-axis direction, and considering that the initial resistance value of each piezoresistor is R and the change in the resistance is ΔR, the voltages V1, V2, V3 and V4 at the middle contact point in the first pair of piezoresistors, the second pair of piezoresistors, the third pair of piezoresistors and the fourth pair of piezoresistors, respectively, are $$V1 = \frac{1}{2}V + \frac{1}{2}\frac{\Delta R}{R}V$$

$$V2 = \frac{1}{2}V - \frac{1}{2}\frac{\Delta R}{R}V$$

$$V3 = \frac{1}{2}V + \frac{1}{2}\frac{\Delta R}{R}V$$

$$V4 = \frac{1}{2}V - \frac{1}{2}\frac{\Delta R}{R}V$$

Consequently, the signal voltage in the z-axis direction is:

$$Vz = (V1 - V4) + (V3 - V2) = \frac{1}{2}2\frac{\Delta R}{R}V$$

If the applied force is in the x-axis direction, the voltages V1, V2, V3 and V4 at the middle contact point in the first pair of piezoresistors, the second pair of piezoresistors, the third pair of piezoresistors, and the fourth pair of piezoresistors, respectively, are:

$$V1 = 0$$

$$V2 = \frac{1}{2}V + \frac{1}{2}\frac{\Delta R}{R}V$$

$$V3 = 0$$

$$V4 = \frac{1}{2}V - \frac{1}{2}\frac{\Delta R}{R}V$$

Consequently, the signal voltage in the x-axis direction is:

$$Vx = (V4 - V2) = \frac{\Delta R}{R}V$$

Figure 10A:
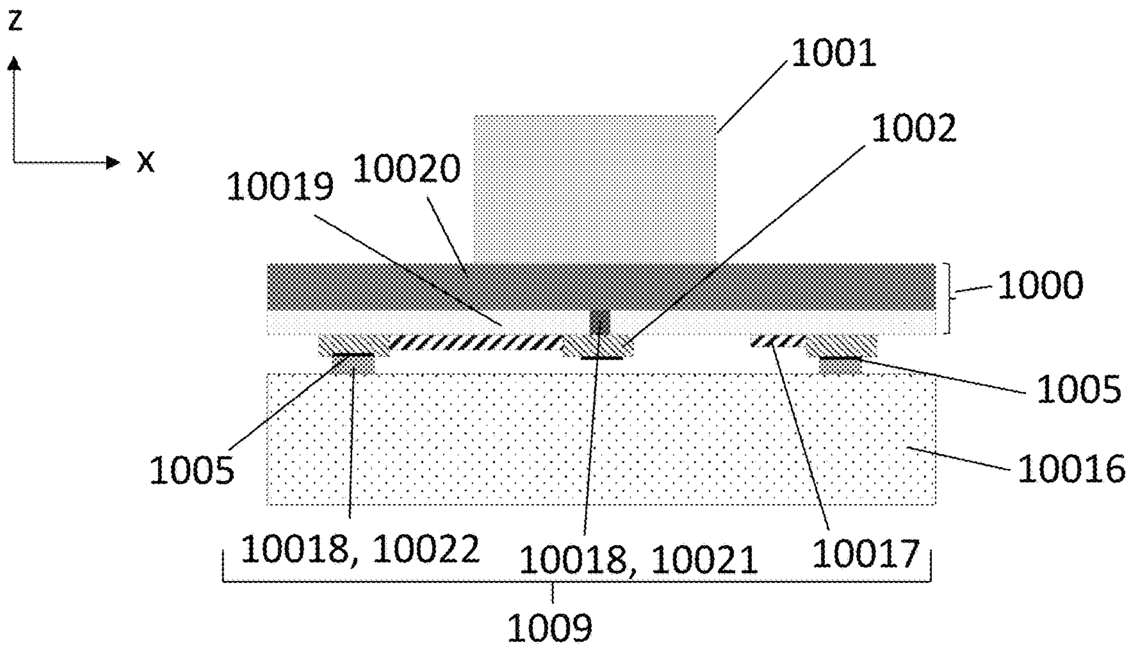
FIG. 10*a* illustrates an example of a sectional view of a multi-axis force sensor with a flexible element having a multi-layer structure in accordance with an exemplary aspect of the present disclosure.

FIG. 10*a* illustrates an example of a sectional view of a multi-axis force sensor with a flexible element having a multilayer structure. Such structure may be fabricated using semiconductor technology. The flexible element 1000 may have a multilayer structure comprising at least one dielectric layer 10019 forming the bottom surface of the flexible element and at least one semiconductor layer 10020 on top of the dielectric layer. The set of electrical connections 1009 may comprise a subset of out-of-plane connections 10018 comprising one or more electrical vias 10021 in the dielectric layer 10019 wherein the one or more electrical vias 10021 are connected to either the central contact point or the peripheral contact point in each set of contact points 1005. The one or more electrical vias 10021 may be ground connections. The set of electrical connections 1009 may also comprise a subset of in-plane connections 10017. A multilayer structure refers here to a structure comprising at least two thin film material layers, wherein one layer is deposited on top of the other layer. The layers may be semiconductor layers or dielectric layers. Alternatively, one layer may be a semiconductor layer and the other layer may be a dielectric layer. The layers may be formed by methods including, but not limited to, thermal evaporation, molecular beam epitaxy, chemical vapor deposition, sputtering, atomic layer deposition. The semiconductor layer may be, but is not limited to, silicon layer. The dielectric layer may be, but is not limited to, SiO2 layer. The piezoresistors may be made of a semiconductor material such as silicon. These options may apply to any aspects is this disclosure. The multi-axis force sensor may further comprise a substrate 10016 below the piezoresistors 1002 and the subset of out-of-plane connections 10018 may further comprise one or more electrical interconnectors 10022 which extend from the substrate 10016 to the sets of contact points 1005. The expression "electrical interconnector" refers here to an electrical conductor or contact that connects electrically the substrate with one or more piezoresistors. The one or more electrical interconnectors 10022 may be signal connections. The electrical interconnectors may be made of a variety of metals that include but are not limited to Al, Cu, Ag, Au, Pt, Pd, Mo or metal alloys. The metals may be formed by a variety of deposition methods such as sputtering, chemical vapor deposition, molecular beam epitaxy, electron beam physical vapor evaporation, or laser metal deposition. These options apply to all aspects in this disclosure. Reference numbers 1000, 1001, 1002, and 1005 in FIG. 10*a* correspond to reference numbers 500, 501, 502, and 505, respectively, in FIG. 5.

Figure 10B:
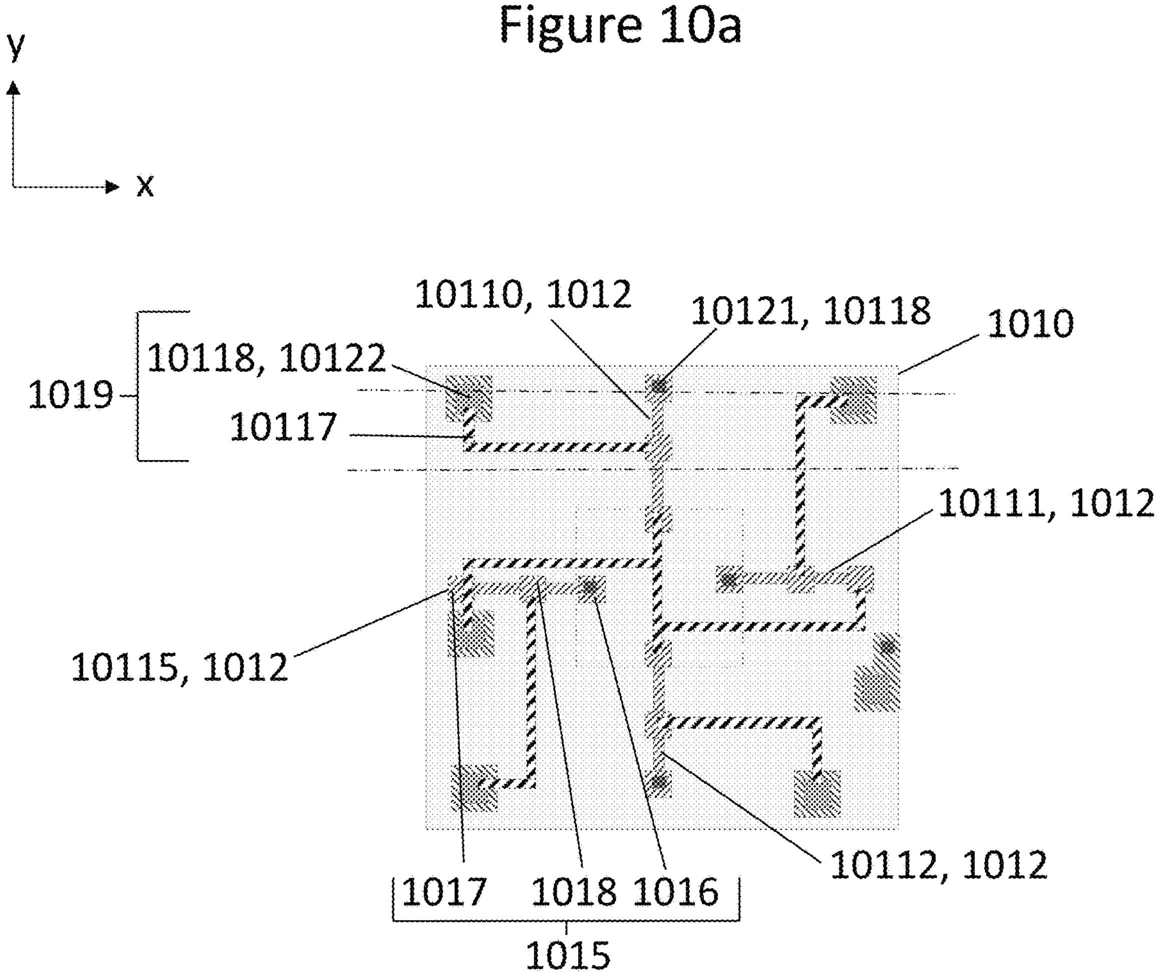
FIG. 10*b* illustrates an example of the arrangement of electrical connections in a multi-axis force sensor with a flexible element having a multi-layer structure in accordance with an exemplary aspect of the present disclosure.

FIG. 10*b* illustrates a possible arrangement of electrical connections in a multi-axis force sensor with a flexible element having a multi-layer structure. The dash lines show the section of the device that is illustrated on FIG. 10*a*. The multi-axis force sensor comprises a first pair of piezoresistors 10110, a second pair of piezoresistors 10111, a third pair of piezoresistors 10112 and a fourth pair of piezoresistors 10115. Each pair of piezoresistors 1012 comprises a set of contact points 1015 which comprises a central contact point 1016, a peripheral contact point 1017 and a middle contact point 1018. The multi-axis force sensor further comprises a set of electrical connections 1019 which may comprise a subset of in-plane connections 10117 and a subset of out-of-plane connections 10118. The subset of out-of-plane connections 10118 may comprise one or more electrical interconnectors 10122 and one or more electrical vias 10121.

In this example, the peripheral contact points 1017 of the first pair 10110 and the third pair 10112 of piezoresistors and the central contact points 1016 of the second pair 10111 and the fourth pair 10115 of piezoresistors are connected to a shared low voltage contact. The low voltage contact is a shared ground contact through the electrical vias 10121 in the dielectric layer. Simultaneously, the central contact points 1016 of the first pair and the third pair 10112 of piezoresistors and the peripheral contact points 1017 of the second pair 10111 and the fourth pair 10115 of piezoresistors are connected to a shared high voltage contact via the in-plane electrical connections 10117 and an electrical interconnector 10122. Each middle contact point 1018 is connected to a separate measurement contact via the in-plane electrical connections 10117 and the electrical interconnectors 10122. With such configuration, the total number of electrical contacts may be reduced to six or less contacts. Reference numbers 1010, 1012, 1015 and 10121 in FIG. 10*b* correspond to reference numbers 1000, 1002, 1005 and 10021 respectively, in FIG. 10*a*. Reference numbers 1016, 1017, 1018, 10110, 10111, 10112 and 10115 in FIG. 10*b* correspond to reference numbers 916, 917, 918, 9110, 9111, 9112 and 9115, respectively, in FIG. 9*b*.

FIGS. 11*a-f* show a possible fabrication process of the force sensor using micromachining steps. The process may start with the growth or deposition of a layered structure comprising a semiconductor layer 11024 and a first insulating layer 11023 on a first substrate 11025 as shown on FIG. 11 *a*. The first substrate may be a silicon wafer. The layered structure may be a silicon on insulator layer (SOI), and the insulator may be a dielectric material such as $SiO_2$, or $Al_2O_3$, or $TiO_2$, or $T_2O_5$. The semiconductor layer thickness may for example be in the range [0.5-2] μm, or [0.75-1.5] μm, or [1-2] μm or [1-1.5] μm. The first insulating layer thickness may for example be in the range [150-1000] nm, or [200-800] nm, or [300-600] nm.

Figure 11A:
FIGS. 11*a-f* illustrate an example of the fabrication process of a force sensor in accordance with an exemplary aspect of the present disclosure.
Figure 11B:

FIG. 11*b* shows a further step in the fabrication process. A second insulating layer 11126 may be deposited on the semiconductor layer 11024. The second insulating layer 11126 may be, but is not limited to, $SiO_2$, or $Al_2O_3$, or $TiO_2$, or $T_2O_5$, or $Si_3N_4$. The second insulating layer thickness may for example be in the range [100-500] nm, or [200-400] nm, or [300-400] nm.

The first and the second insulating layers may be grown by a variety of deposition methods including but not limited to ion implantation, atomic layer deposition (ALD), metalorganic vapor phase epitaxy (MOVPE). These options apply to all aspects in this disclosure.

Figure 11C:
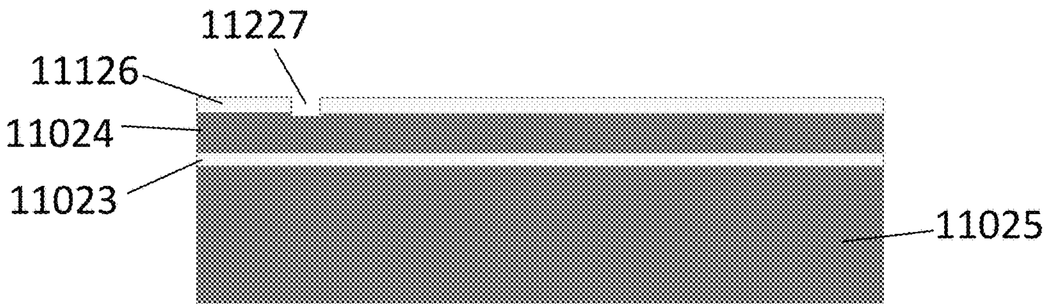

FIG. 11*c* shows a further step in the fabrication process where via holes 11227 are patterned on the second insulating layer 11126.

Figure 11D:
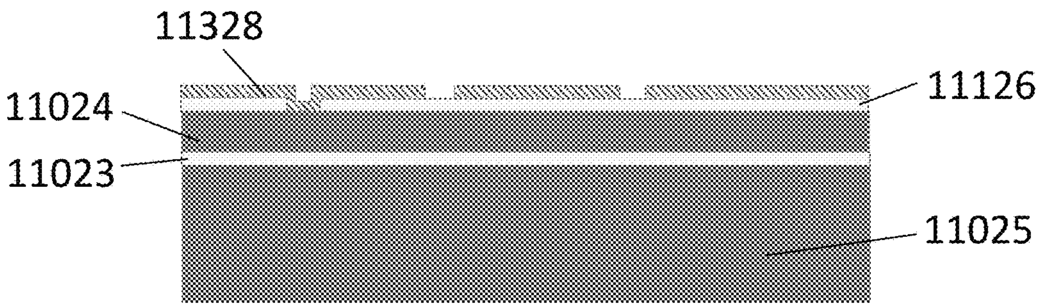

FIG. 11*d* shows the next step in the fabrication process where a piezoresistive 11328 layer is formed on the second insulating layer 11126. Subsequently the piezoresistive layer is patterned to form piezoresistors. The piezoresistive layer may be a semiconducting layer such as polycrystalline silicon. The piezoresistive layer thickness may for example be in the range [100-500] nm, or [200-400] nm, or [300-500] nm.

Figure 11E:
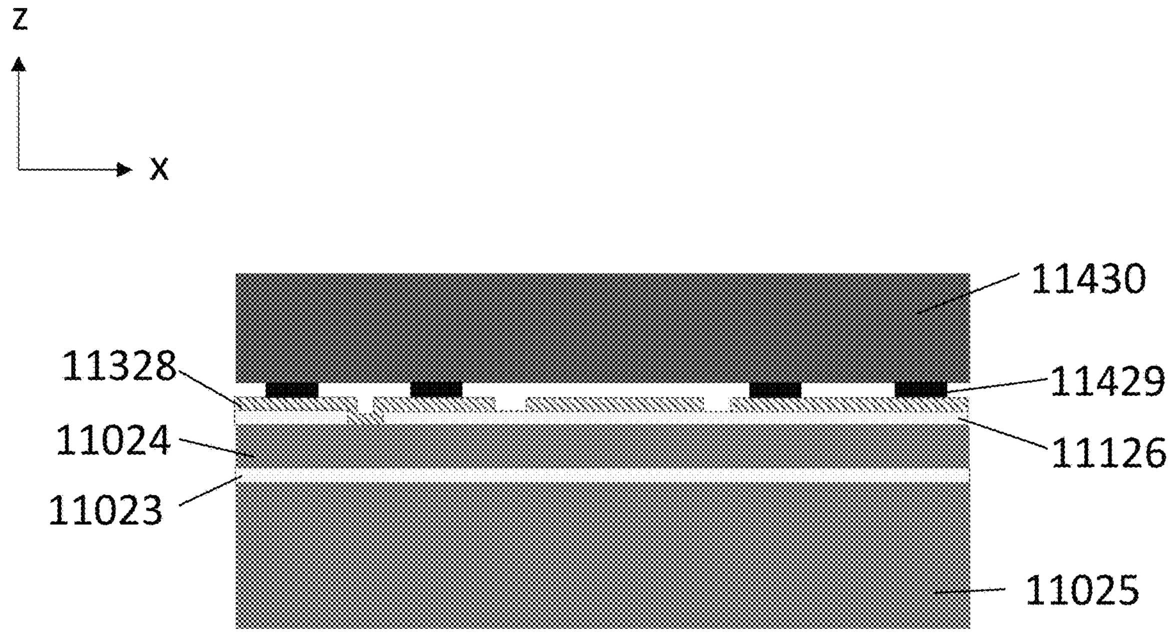
Figure 11F:
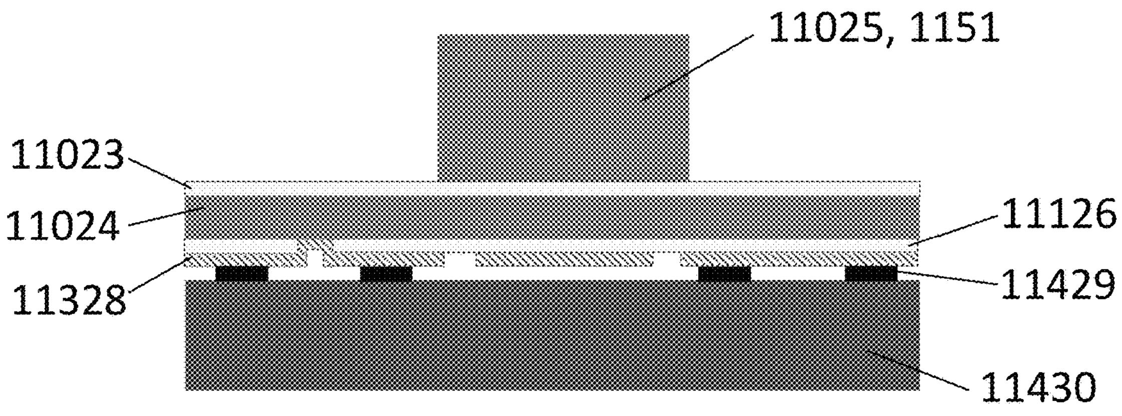

FIG. 11*e* shows a further step in the fabrication process. A conductive layer is deposited on the piezoresistive layer 11328. The conductive layer is subsequently patterned to form electrical contacts 11429 (patterning process not shown in the Figure). The full structure, which comprises the first substrate 11025, the semiconductor layer 11024, the first insulating layer 11023, the second insulating layer 11126 and the piezoresistive layer 11328, is after that bonded with a second substrate 11430 to create an electrical connection. The second substrate may be a semiconductor wafer such as a silicon wafer, a glass wafer with semiconductor vias, or an ASIC wafer having analogues to digital convertors that sample the signal voltage. The conductive layer may be made of a variety of metals that include but are not limited to Al, Cu, Ag, Au, Pt, Pd, Mo or metal alloys. The metal layer may be formed by a variety of deposition methods such as sputtering, chemical vapor deposition, molecular beam epitaxy, electron beam physical vapor evaporation, or laser metal deposition. These options may apply to all aspects in this disclosure. FIG. 11 *f* shows the final step of the fabrication process where the mass element 1151 is formed by etching the first substrate 11025. Reference number 1151 in FIG. 11*f* corresponds to reference number 101 in FIG. 1.

In general, the description of the aspects disclosed should be considered as being illustrative in all respects and not being restrictive. The scope of the present invention is shown by the claims rather than by the above description and is intended to include meanings equivalent to the claims and all changes in the scope. While preferred aspects of the invention have been described above, it is to be understood that variations and modifications will be apparent to those skilled in the art without departing from the scope and spirit of the invention.

What is claimed:

1. A multi-axis force sensor comprising:

a flexible element including a center, a top surface, a bottom surface, one or more edges, a central area surrounding the center, and a peripheral area adjacent to the one or more edges;

a mass element located on the top surface of the flexible element in the central area such that the flexible element is configured to bend in a direction when a force acts on the mass element; and at least three pairs of piezoresistors located on the bottom surface of the flexible element;

wherein the flexible element defines a horizontal xy-plane and a vertical z-direction that is perpendicular to the horizontal xy-plane, and wherein the flexible element has a multilayer structure comprising a dielectric layer forming the bottom surface of the flexible element and a semiconductor layer on top of the dielectric layer, wherein a second insulating layer is deposited on the semiconductor layer, and wherein a piezoresistive layer is formed on the second insulating layer and patterned to form the at least three pairs of piezoresistors, and wherein a conductive layer is deposited on the piezoresistive layer and patterned to form electrical contacts.

2. The multi-axis force sensor of claim 1, wherein the at least three pairs of piezoresistors are symmetrically arranged in the horizontal xy-plane around the center of the flexible element such that each pair of the at least three pairs of piezoresistors has a first end in the central area of the flexible element and a second end in the peripheral area of the flexible element.

3. The multi-axis force sensor of claim 2, wherein each pair of the at least three pairs of the piezoresistors further comprises:

an inner piezoresistor and an outer piezoresistor connected in series, and a set of contact points, and wherein the set of contact points include a central contact point in the central area of the flexible element, a peripheral contact point in the peripheral area of the flexible element, and a middle contact point between the inner piezoresistor and the outer piezoresistor such that the inner piezoresistor is connected between the central contact point and the middle contact point, and the outer piezoresistor is connected between the middle contact point and the peripheral contact point.

4. The multi-axis force sensor of claim 3, further comprising:

a set of electrical connections configured to connect each set of contact points to a measurement contact, a high-voltage contact, and a low-voltage contact, wherein each measurement contact is connected to the middle contact point in the set of contact points.

5. The multi-axis force sensor of claim 4, further comprising:

a substrate below the piezoresistors, wherein each electrical connection in the set of electrical connections extend from the substrate to the sets of contact points.

6. The multi-axis force sensor of claim 4, wherein the semiconductor layer is a thickness of 0.5-2 μm.

7. The multi-axis force sensor of claim 6, wherein the set of electrical connections comprises a subset of out-of-plane connections comprising one or more electrical vias, and wherein the one or more electrical vias are connected to at least one of the central contact point or the peripheral contact point in each set of contact points.

8. The multi-axis force sensor of claim 7, wherein the multi-axis force sensor further comprises a substrate below the piezoresistors, and wherein the subset of out-of-plane connections further comprises one or more electrical interconnectors which extend from the substrate to the sets of contact points.

9. The multi-axis force sensor of claim 4, wherein the at least three pairs of piezoresistors comprise a first pair of piezoresistors, a second pair of piezoresistors, and a third pair of piezoresistors.

10. The multi-axis force sensor of claim 9, wherein the set of electrical connections comprises a subset of in-plane connections, and wherein the peripheral contact points of the first pair, the second pair and the third pair of piezoresistors are connected to a shared low voltage contact through the subset of in-plane connections, and the central contact points of the first pair, the second pair and the third pair of piezoresistors are connected to a shared high voltage contact through the subset of in-plane connections.

11. The multi-axis force sensor of claim 9, wherein the at least three pairs of piezoresistors further comprise a fourth pair of piezoresistors, and wherein the first pair and the third pair of piezoresistors are arranged opposite to each other on different sides of the central area, and the second pair and the fourth pair of piezoresistors are arranged opposite to each other on different sides of the central area.

12. The multi-axis force sensor of claim 11, wherein the set of electrical connections comprises a subset of in-plane connections, and wherein the peripheral contact points of the first pair and the third pair of piezoresistors and the central contact points of the second pair and the fourth pair of piezoresistors are connected to a shared low voltage contact through the subset of in-plane connections, and the central contact points of the first pair and the third pair of piezoresistors and the peripheral contact points of the second pair and the fourth pair of piezoresistors are connected to a shared high voltage contact through the subset of in-plane connections.

13. The multi-axis force sensor of claim 12, wherein the low-voltage contact is a ground contact.

14. The multi-axis force sensor of claim 2, wherein the piezoresistors are made of a semiconductor material.

15. A multi-axis force sensor comprising:

a flexible element including a center, a top surface, a bottom surface, one or more edges, a central area surrounding the center, and a peripheral area adjacent to the one or more edges;

a mass element located on the top surface of the flexible element in the central area such that the flexible element bends in a direction when a force acts on the mass element; and at least three pairs of piezoresistors located on the bottom surface of the flexible element, wherein the flexible element defines a horizontal xy-plane and a vertical z-direction which is perpendicular to the horizontal xy-plane, wherein each pair of the at least three pairs of the piezoresistors further comprise an inner piezoresistor and an outer piezoresistor connected in series, wherein the at least three pairs of piezoresistors comprise a first pair of piezoresistors, a second pair of piezoresistors, and a third pair of piezoresistors, and wherein the flexible element has a multilayer structure comprising a dielectric layer forming the bottom surface of the flexible element and a semiconductor layer on top of the dielectric layer, wherein a second insulating layer is deposited on the semiconductor layer, and wherein a piezoresistive layer is formed on the second insulating layer and patterned to form the at least three pairs of piezoresistors, and wherein a conductive layer is deposited on the piezoresistive layer and patterned to form electrical contacts.

16. The multi-axis force sensor of claim 15, further comprising a set of contact points that includes a central contact point in the central area of the flexible element, a peripheral contact point in the peripheral area of the flexible element, and a middle contact point between the inner piezoresistor and the outer piezoresistor such that the inner piezoresistor is connected between the central contact point and the middle contact point, and the outer piezoresistor is connected between the middle contact point and the peripheral contact point.

17. The multi-axis force sensor of claim 16, further comprising:

a set of electrical connections configured to connect each set of contact points to a measurement contact, a high-voltage contact, and a low-voltage contact, wherein the set of electrical connections comprises a subset of out-of-plane connections comprising one or more electrical vias, and wherein the one or more electrical vias are connected to at least one of the central contact point or the peripheral contact point in each set of contact points.

18. The multi-axis force sensor of claim 17, wherein the low-voltage contact is a ground contact.

19. The multi-axis force sensor of claim 15, wherein the piezoresistors are made of a semiconductor material.

20. The multi-axis force sensor of claim 15, wherein the semiconductor layer is a thickness of 0.5-2 μm.

* * * * *